(12) United States Patent
Kwak et al.

(10) Patent No.: US 11,060,648 B2
(45) Date of Patent: Jul. 13, 2021

(54) CONNECTING DEVICE FOR PIPING

(71) Applicant: ESSEN TECH CO., LTD., Gunsan-si (KR)

(72) Inventors: Ji Ho Kwak, Suwon-si (KR); Jung Hoon Choi, Incheon (KR); Ha Yeong Seong, Incheon (KR); Sang In Jang, Incheon (KR)

(73) Assignee: ESSEN TECH CO., LTD., Gunsan-si (KR)

( * ) Notice: Subject to any disclaimer, the term of this patent is extended or adjusted under 35 U.S.C. 154(b) by 79 days.

(21) Appl. No.: 16/744,903

(22) Filed: Jan. 16, 2020

(65) Prior Publication Data

US 2021/0033233 A1 Feb. 4, 2021

(30) Foreign Application Priority Data

Jul. 30, 2019 (KR) .................. 10-2019-0092226

(51) Int. Cl.
*F16L 37/091* (2006.01)
*F16L 37/133* (2006.01)
*F16L 15/00* (2006.01)

(52) U.S. Cl.
CPC ........... *F16L 37/133* (2013.01); *F16L 15/007* (2013.01); *F16L 15/008* (2013.01); *F16L 37/091* (2013.01)

(58) Field of Classification Search
CPC .... F16L 37/091; F16L 37/0915; F16L 15/008
USPC ....................................... 285/340
See application file for complete search history.

(56) References Cited

U.S. PATENT DOCUMENTS

| | | | | |
|---|---|---|---|---|
| 3,434,744 A | * | 3/1969 | Paterson | F16L 19/12 285/52 |
| 4,802,696 A | * | 2/1989 | Chohan | F16L 37/091 285/317 |
| 8,303,001 B2 | * | 11/2012 | Oh | F16L 25/0054 285/340 |
| 10,948,116 B2 | * | 3/2021 | Hagen | F16L 37/091 |
| 2009/0021001 A1 | * | 1/2009 | Oh | F16L 25/0036 285/80 |

FOREIGN PATENT DOCUMENTS

| | | | | |
|---|---|---|---|---|
| EP | 1139002 A1 | * | 10/2008 | ......... F16L 37/0915 |
| JP | 2003056765 A | | 2/2003 | |
| JP | 4161333 B2 | * | 10/2008 | ......... F16L 37/0915 |
| KR | 2020000010261 U | | 6/2000 | |
| KR | 1020150073590 A | | 7/2015 | |

* cited by examiner

*Primary Examiner* — David Bochna
(74) *Attorney, Agent, or Firm* — Rabin & Berdo, P.C.

(57) ABSTRACT

Disclosed is a connecting device for piping for connecting a pipe to another pipe or to another part for piping. The connecting device includes an adapter and a pipe nipple configured to be threadedly engaged with the adapter. The pipe nipple is fixed to an end of a pipe, and an end of another pipe is inserted into the adapter. The adapter includes a hollow adapter body, a cap coupled to the adapter body, a grip ring configured to fix the pipe introduced into the adapter body, a body-sealing member configured to provide a seal between the adapter body and the pipe, a sleeve disposed between the grip ring and the body-sealing member, and a metal sealing member configured to provide a seal between the adapter body and the pipe nipple.

8 Claims, 8 Drawing Sheets

CONNECTING DEVICE FOR PIPING

BACKGROUND OF THE INVENTION

Field of the Invention

The present invention relates to a connecting device for piping, and more particularly to a connecting device for piping, which enables convenient connection of pipes that constitute a piping structure for conveying various kinds of fluid.

Description of the Related Art

In general, a piping structure is used for conveyance of a fluid in various devices or facilities, from various machines to household or large-scale industrial facilities, which need the supply of fluid thereto. Such a piping structure is typically composed of a plurality of pipes interconnecting a fluid supply part and a fluid use part.

Because pipes are manufactured to specific standard sizes due to limitations on transportation, handling, and the like, when it is desired to form a piping structure to a length greater than the standard length of each pipe or to form a bent piping structure, various types of pipe-connecting devices are used to connect pipes to each other. As examples of pipe-connecting devices, there are couplings, elbows, T-shaped joints, sockets, and the like.

As examples of pipes constituting a piping structure, there are copper pipes, stainless steel pipes, synthetic resin pipes, and pipes made of various other materials, which are selectively used depending on the type of fluid that flows through the piping structure. Various types of connecting methods are selectively used depending on the type of pipe.

Pipe-connecting methods include a flange-coupling method, in which pipes are connected to each other using flanges formed at the ends of pipes that are adjacent to each other, a coupling-connection method, in which pipes are connected to each other by inserting the ends thereof into a corresponding coupling, a thread-engagement method, in which pipes are threadedly engaged with each other using threads formed at the ends of pipes that are adjacent to each other, a band-connection method, in which the ends of pipes are connected to each other using a stainless band, and an electric-fusion-connection method, in which the ends of pipes to be connected are fused to each other using a mesh-type hot wire. In addition, a flare-connection method is used for a piping structure in which a high-pressure fluid such as a refrigerant is conveyed.

A flare-connection method is performed in the manner of forming an expanded-pipe portion at the end of a pipe through plastic working using a jig, placing the expanded-pipe portion on a tapered portion of a joint body, and fastening a cap nut such that the expanded-pipe portion is press-fitted between a tapered surface of the cap nut and the tapered portion of the joint body, thereby securing airtightness.

However, since this method requires a process of performing plastic working on the end of a pipe, it is cumbersome, time-consuming, and difficult for an ordinary person who is not skilled in the art to carry out.

RELATED ART DOCUMENT

Patent Document (Patent Document 1) Korean Unexamined Utility Model Publication No. 2000-0010261 (Jun. 15, 2000)

SUMMARY OF THE INVENTION

Therefore, the present invention has been made in view of the above problems, and it is an object of the present invention to provide a connecting device for piping enabling rapid and convenient connection between pipes or between a pipe and another part for piping.

However, the objects to be accomplished by the present invention are not limited to the above-mentioned object, and other objects not mentioned herein will be clearly understood by those skilled in the art from the following description.

In accordance with the present invention, the above and other objects can be accomplished by the provision of a connecting device for piping for connecting a pipe to another pipe or to another part for piping, the connecting device including an adapter body having a hollow structure, the adapter body including a cap-coupling threaded portion formed in one end thereof, a nipple-coupling threaded portion formed in the opposite end thereof, and a tapered seating portion formed therein such that a width thereof gradually decreases from the nipple-coupling threaded portion toward the cap-coupling threaded portion, a cap including a cap through-hole formed therein to allow a pipe to pass therethrough and a cap threaded portion formed so as to correspond to the cap-coupling threaded portion to be threadedly engaged with the adapter body, a body-sealing member disposed in the adapter body so as to contact the outer circumferential surface of a pipe entering the adapter body, a grip ring disposed in the adapter body, the grip ring including a plurality of latching pieces configured to be elastically deformed by contact with the outer circumferential surface of a pipe entering the adapter body to fix the pipe to the adapter body, a pipe nipple fixed to a pipe or another part for piping, the pipe nipple including a nipple through-hole formed therein to allow a fluid to flow therethrough, a nipple threaded portion formed so as to correspond to the nipple-coupling threaded portion to be threadedly engaged with the adapter body, and a nipple tapered portion protruding in a forward direction of the nipple threaded portion while gradually decreasing in width, and a metal sealing member including a sealing member body provided at an outer side thereof with an outer contact surface tapered so as to closely contact the tapered seating portion and provided at an inner side thereof with an inner contact surface tapered so as to closely contact the nipple tapered portion, the metal sealing member being disposed in the adapter body to provide a seal between the adapter and the pipe nipple.

The adapter body may include a protruding portion formed to have a constant width between the nipple-coupling threaded portion and the tapered seating portion, the pipe nipple may include a nipple cylindrical portion having a cylindrical shape and formed to have a width smaller than the width of the protruding portion between the nipple threaded portion and the nipple tapered portion, and the metal sealing member may include a plurality of sealing member protrusions protruding from the edge of the sealing member body so as to be located on the protruding portion and to contact the outer surface of the nipple cylindrical portion.

The connecting device may further include a sleeve including a hollow sleeve body having an outer surface that is capable of coming into contact with the inner surface of the adapter body. The sleeve may be disposed between the body-sealing member and the grip ring within the adapter so as to support the body-sealing member and the grip ring.

The adapter body may include a window formed through a portion thereof to expose the interior of the adapter body to the outside. The sleeve may be light-transmissive, and may be disposed at the position at which the window is formed.

The sleeve may include a ring-shaped inner sleeve rim portion, which protrudes from one end of the sleeve body in an inward direction of the sleeve body so as to closely contact the body-sealing member.

The grip ring may be disposed such that the edge thereof is interposed between the sleeve and the cap, and the cap may be in contact at an end thereof with the grip ring to press the grip ring and the sleeve toward the body-sealing member.

The grip ring may include a plurality of connecting portions interconnecting adjacent ones of the plurality of latching pieces, and the cap may be provided at an end thereof with a seating groove in which the plurality of connecting portions is received. The seating groove may be formed to surround the cap through-hole.

The latching pieces may be disposed around a pipe introduced into the adapter body so as to be inclined toward the pipe, and the cap may be provided at an end thereof with an inclined support portion that is inclined at an angle that corresponds to the angle at which the latching pieces are inclined so as to support the latching pieces within the grip ring.

The connecting device may further include a cap-sealing member disposed in the cap so as to be capable of coming into contact with the outer circumferential surface of the pipe passing through the cap.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, exemplary embodiments of the present invention will be described in detail with reference to the accompanying drawings so that those skilled in the art can easily carry out the embodiments. The present invention may, however, be embodied in many different forms, and should not be construed as being limited to the embodiments set forth herein.

Portions unrelated to the description are omitted to more clearly describe the present invention, and the same or extremely similar components are denoted by the same reference numerals throughout the specification.

In addition, in several exemplary embodiments, components having the same configuration are representatively described using the same reference numerals as in an exemplary embodiment, and only components different from those of the exemplary embodiment are described in the other exemplary embodiments.

Throughout the specification, when an element is referred to as being "connected" to another element, the element and the other element may be "directly connected" to each other, or may be "indirectly connected" to each other with one or more intervening elements interposed therebetween. In addition, throughout the specification, when an element is referred to as "including" another element, the element should not be understood as excluding other elements so long as there is no special conflicting description, and the element may include at least one other element.

Figure 1:
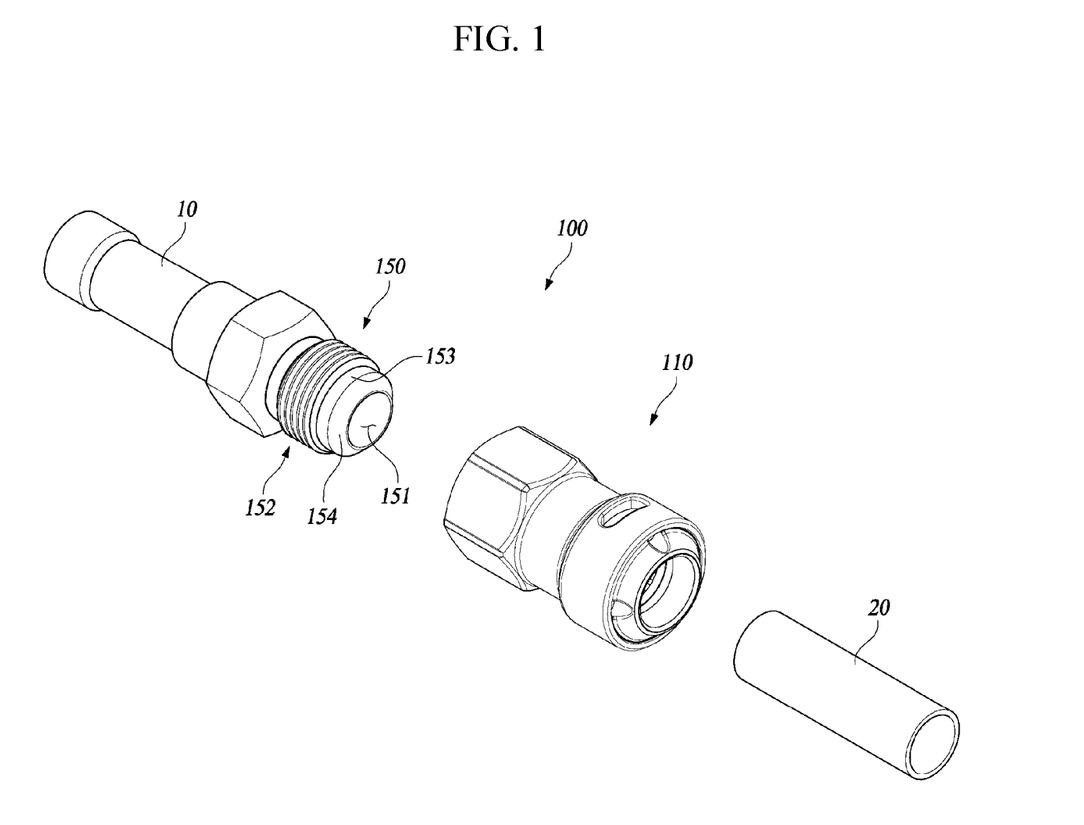
FIG. 1 is a view showing a connecting device for piping according to an embodiment of the present invention and pipes that are connected to each other thereby.
Figure 2:
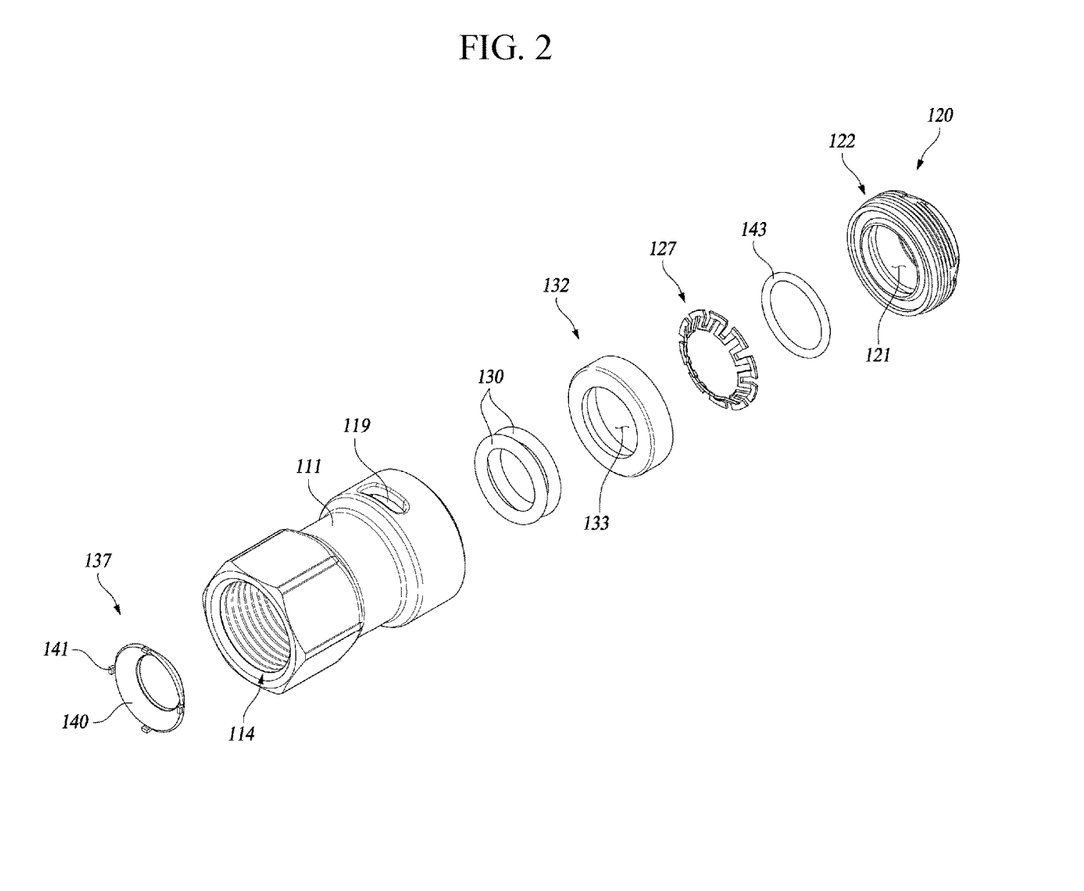
FIGS. 2 and 3 are exploded perspective views of an adapter of the connecting device for piping according to the embodiment of the present invention.
Figure 3:
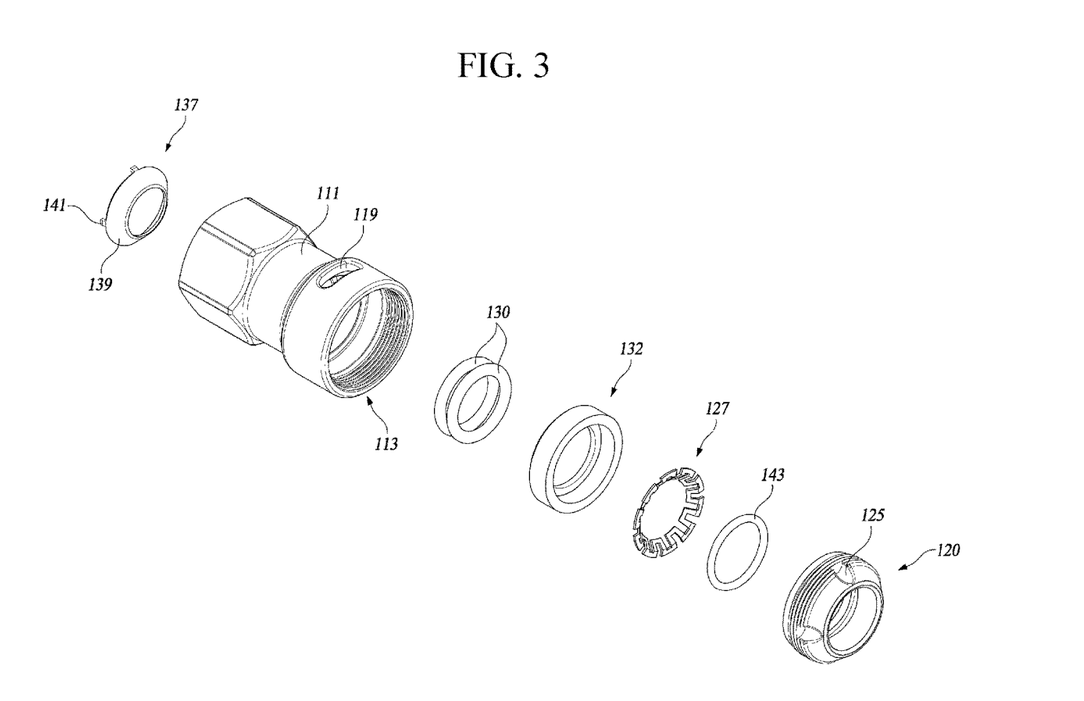
Figure 4:
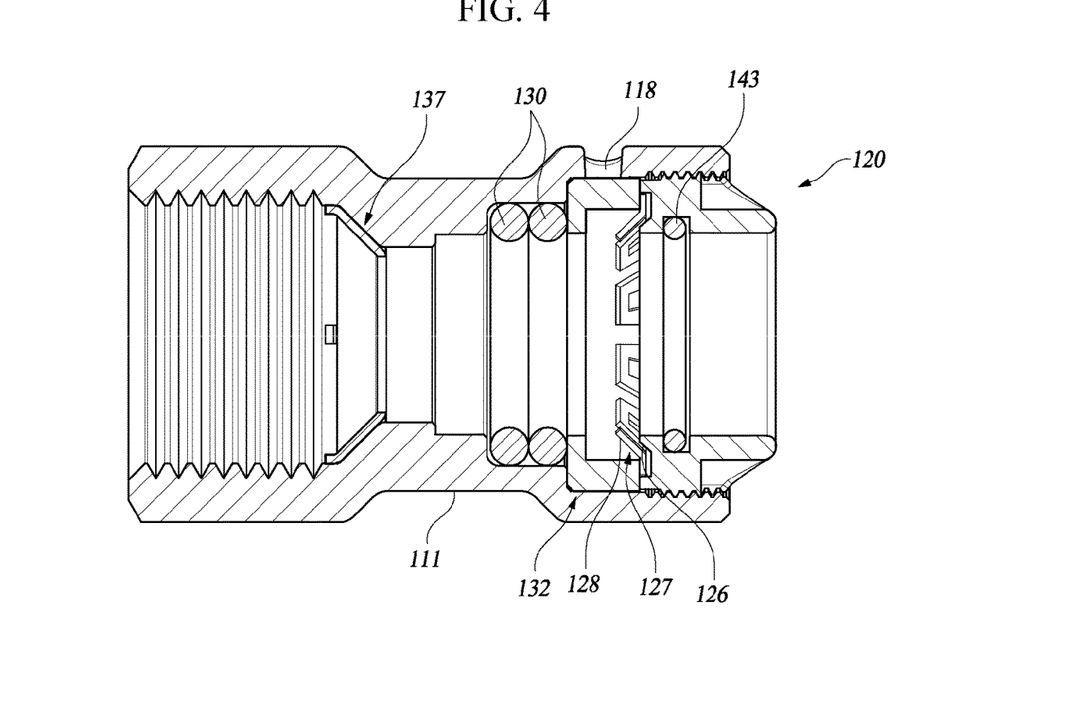
FIG. 4 is a cross-sectional view of the adapter of the connecting device for piping according to the embodiment of the present invention.
Figure 5:
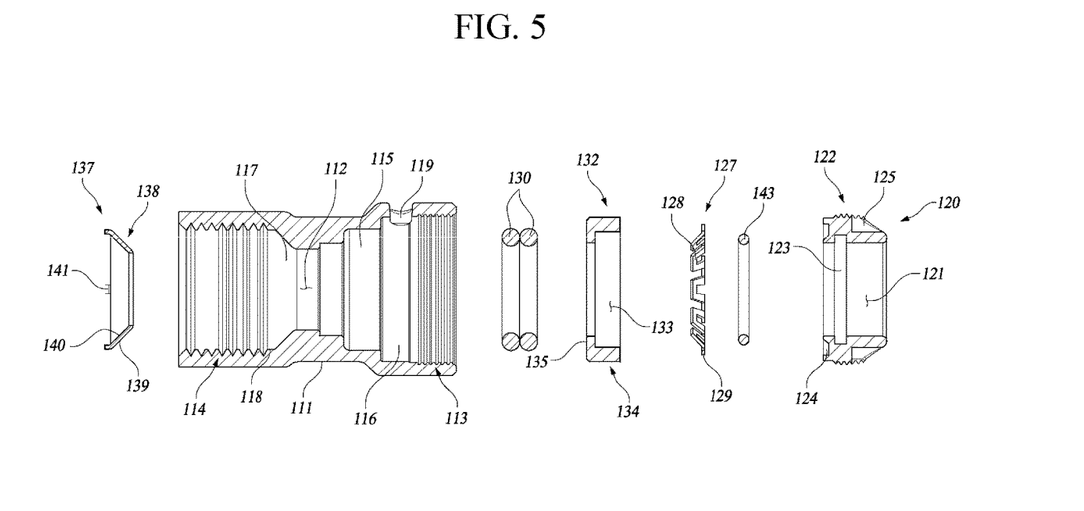
FIG. 5 is an exploded cross-sectional view of the adapter of the connecting device for piping according to the embodiment of the present invention.

FIG. 1 is a view showing a connecting device for piping according to an embodiment of the present invention and pipes that are connected to each other thereby, FIGS. 2 and 3 are exploded perspective views of an adapter of the connecting device for piping according to the embodiment of the present invention, FIG. 4 is a cross-sectional view of the adapter of the connecting device for piping according to the embodiment of the present invention, and FIG. 5 is an exploded cross-sectional view of the adapter of the connecting device for piping according to the embodiment of the present invention.

As shown in the drawings, a connecting device 100 for piping according to an embodiment of the present invention is used to connect a pipe to another pipe or to another part for piping, and includes an adapter 110 and a pipe nipple 150, which is threadedly engaged with the adapter 110. The pipe nipple 150 may be fixed to an end of a pipe 10, and an end of another pipe 20 may be inserted into the adapter 110.

The adapter 110 includes a hollow adapter body 111, a cap 120 coupled to the adapter body 111, a grip ring 127 configured to fix the pipe 20 introduced into the adapter body 111, a body-sealing member 130 configured to provide a seal between the adapter body 111 and the pipe 20, a sleeve 132 disposed between the grip ring 127 and the body-sealing member 130, and a metal sealing member 137 configured to provide a seal between the adapter body 111 and the pipe nipple 150.

The adapter body 111 has a hollow structure in which a passage 112 is formed to allow a fluid to flow therethrough. The adapter body 111 includes a cap-coupling threaded portion 113 formed in one end thereof to allow the cap 120 to be threadedly engaged therewith and a nipple-coupling threaded portion 114 formed in the opposite end thereof to allow the pipe nipple 150 to be threadedly engaged therewith. A body-sealing-member seating portion 115, a sleeve-seating portion 116, a tapered seating portion 117, and a protruding portion 118 are provided between the cap-coupling threaded portion 113 and the nipple-coupling threaded portion 114 inside the adapter body 111. The sleeve-seating portion 116 is a portion in which the sleeve 132 is seated. The sleeve-seating portion 116 has a width that corresponds to the width of the sleeve 132, and is disposed adjacent to the cap-coupling threaded portion 113. The body-sealing-member seating portion 115 is a portion in which the body-sealing member 130 is seated. The body-sealing-member seating portion 115 has a width that corresponds to the width of the body-sealing member 130, and is disposed adjacent to the sleeve-seating portion 116. The tapered seating portion 117 and the protruding portion 118 are portions in which the metal sealing member 137 is seated, and are disposed between the nipple-coupling threaded portion 114 and the body-sealing-member seating portion 115. The protruding portion 118 is formed to have a constant width between the nipple-coupling threaded portion 114 and the tapered seating portion 117. The tapered seating portion 117 is formed such that the width thereof gradually decreases from the protruding portion 118 to the body-sealing-member seating portion 115 between the protruding portion 118 and the body-sealing-member seating portion 115.

In addition, the adapter body 111 includes a window 119 formed therethrough to expose the interior of the adapter body 111 to the outside. The window 119 is formed to communicate with the sleeve-seating portion 116 such that the sleeve 132 seated in the sleeve-seating portion 116 is exposed to the outside through the window 119.

The adapter body 111 may be variously modified in external appearance and internal structure, and may thus differ from the structure shown in the drawings.

The cap 120 has a hollow structure in which a cap through-hole 121 is formed to allow the pipe 20 to pass therethrough. The cap 120 includes a cap threaded portion 122 formed in the outer surface thereof so as to correspond to the cap-coupling threaded portion 113 of the adapter body 111. The cap 120 may be threadedly engaged with the adapter body 111. The cap 120 includes a cap-sealing-member seating portion 123 formed therein. The cap-sealing-member seating portion 123 is a portion in which a cap-sealing member 143 to be described later is seated, and has a width that corresponds to the width of the cap-sealing member 143. The cap 120 is provided at the end thereof with a seating groove 124 into which the grip ring 127 is partially inserted and an inclined support portion 126 for supporting the grip ring 127. When the cap 120 is threadedly engaged with one end of the adapter body 111 and an end of the cap 120 enters the adapter body 111, the grip ring 127 may be partially inserted into the seating groove 124, and may be disposed stably and coaxially with the passage 112 in the adapter body 111. The inclined support portion 126 is formed to be inclined at an angle that corresponds to the angle at which latching pieces 128 provided at the grip ring 127 are inclined. The inclined support portion 126 supports the latching pieces 128 within the grip ring 127 so as to restrict the degree to which the latching pieces 128 are elastically deformed.

In addition, the cap 120 includes a plurality of cap recesses 125 formed in the outer surface thereof. The cap recesses 125 are disposed so as to be spaced at regular intervals apart from each other along the circumference of the cap 120. A tool for rotating the cap 120 may be stably coupled to the cap 120 by being inserted into at least one of the cap recesses 125. Thus, the cap 120 may be smoothly rotated using the tool.

The grip ring 127 is installed inside the adapter body 111, and securely grips the pipe 20 introduced into the adapter body 111 so as to prevent the pipe 20 from being separated from the adapter body 111. The grip ring 127 includes a plurality of latching pieces 128, which are elastically deformed by contact with the outer circumferential surface of the pipe 20, and a plurality of connecting portions 129, which interconnect adjacent ones of the plurality of latching pieces 128. The latching pieces 128 are connected to each other in the circumferential direction so as to surround the outer circumferential surface of the pipe 20 introduced into the adapter body 111, and are disposed at an incline toward the pipe 20. That is, the latching pieces 128 are disposed so as to gradually contract from the cap-coupling threaded portion 113 of the adapter body 111 toward the nipple-coupling threaded portion 114. These latching pieces 128 are supported by the inclined support portion 126 of the cap 120 so as to be prevented from being bent to a predetermined angle or more.

The edge of the grip ring 127 is interposed between the sleeve 132 and the cap 120, and the connecting portions 129 of the grip ring 127 are inserted into the seating groove 124 in the cap 120. Thus, the grip ring 127 is disposed stably and coaxially with the passage 112 in the adapter body 111. In addition, since the cap 120 is threadedly engaged with the adapter body 111, the edge of the grip ring 127 is fitted between the sleeve 132 and the cap 120, and thus the grip ring 127 is stably maintained at a fixed position without moving within the adapter body 111.

Figure 6:
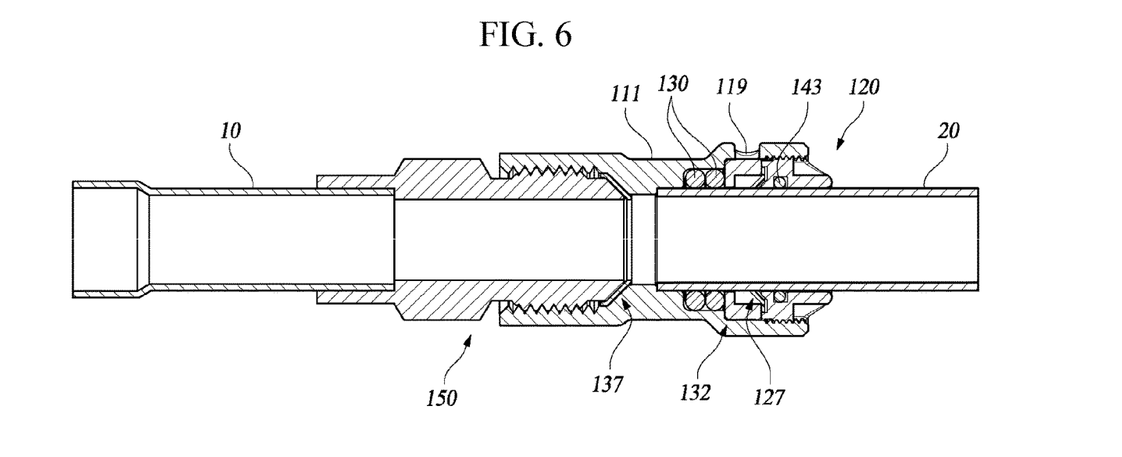
FIG. 6 is a cross-sectional view showing the connection between two pipes using the connecting device for piping according to the embodiment of the present invention.

As shown in FIG. 6, when the end of the pipe 20 is introduced into the adapter body 111 through the cap through-hole 121 in the cap 120, the latching pieces 128 of the grip ring 127 are elastically deformed by close contact with the outer circumferential surface of the pipe 20, thereby securely fixing the pipe 20.

Figure 7:
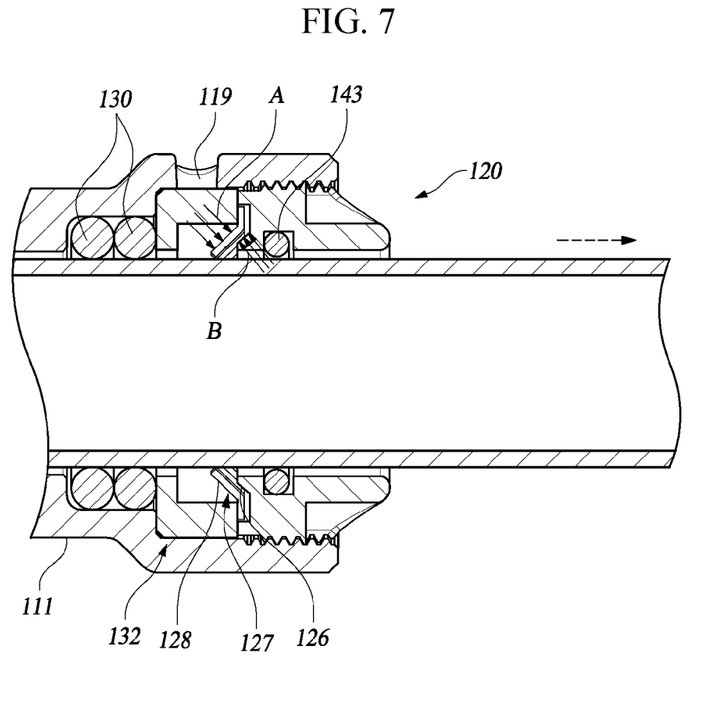
FIG. 7 is a view for explaining the operation of a grip ring of the connecting device for piping according to the embodiment of the present invention.

As shown in FIG. 7, when external force is applied to the pipe 20 in the direction in which the pipe 20 is separated from the adapter body 111 in the state in which the grip ring 127 fixes the pipe 20, the latching pieces 128, which are in close contact with the pipe 20, receive force in the direction indicated by the arrows A, and are elastically deformed such that the angle at which the latching pieces 128 are inclined with respect to the pipe 20 increases. At this time, the inclined support portion 126 of the cap 120 is brought into contact with the latching pieces 128 within the grip ring 127, and applies reaction force to the latching pieces 128 in the direction indicated by the arrows B to support the latching pieces 128. Thus, elastic deformation of the latching pieces 128 is restricted, and the grip ring 127 continuously and stably fixes the pipe 20 so that the pipe 20 is not separated from the adapter body 111.

The grip ring 127 may be modified into any of various structures other than the structure shown in the drawings, so long as a plurality of latching pieces capable of being elastically deformed by close contact with the outer surface of the pipe 20 is included.

The body-sealing member 130 is formed in an O-ring shape, and is made of an elastically deformable material such as rubber or silicon. The body-sealing member 130 is disposed in the body-sealing-member seating portion 115 of the adapter body 111, and thus is stably maintained at a fixed position without moving within the adapter body 111. The body-sealing member 130 is brought into close contact with the outer circumferential surface of the pipe 20 introduced into the adapter body 111, thereby providing a seal between the adapter body 111 and the pipe 20.

The sleeve 132 includes a hollow sleeve body 134, the outer surface of which is capable of coming into contact with the inner surface of the adapter body 111, and a ring-shaped inner sleeve rim portion 135, which protrudes from one end of the sleeve body 134 in the inward direction of the sleeve body 134. The sleeve 132 is disposed in the sleeve-seating portion 116 of the adapter body 111, and thus is stably maintained at a fixed position without moving within the adapter body 111. Since the inner sleeve rim portion 135 is brought into close contact with the body-sealing member 130, the sleeve 132 fixes the body-sealing member 130 so that the body-sealing member 130 is unmovable. In addition, since the opposite end of the sleeve body 134 is brought into close contact with the edge of the grip ring 127, the sleeve 132 fixes the grip ring 127 together with the cap 120 so that the grip ring 127 is unmovable. The sleeve 132 may be formed to be light-transmissive. That is, the sleeve 132 may be made of a transparent or translucent material.

The sleeve 132 may be exposed to the outside of the adapter body 111 through the window 119. That is, the sleeve-seating portion 116, in which the sleeve 132 is located, communicates with the window 119 such that the sleeve 132 is visible from the outside of the adapter body 111. In addition, since the sleeve 132 is light-transmissive, the interior of the sleeve 132 may be exposed to the outside through the window 119. Thus, in the process of coupling the pipe 20 to the adapter 110, a user may look into the sleeve 132 through the window 119, and may verify whether the pipe 20 has been inserted into the adapter 110 normally or whether the pipe 20 has been stably fixed by the grip ring 127. In addition, a user may stably couple the pipe 20 to the adapter 110 by appropriately adjusting the depth to which the pipe 20 is inserted while verifying the position of the pipe 20 within the sleeve 132.

The sleeve 132 may be modified into any of various structures, other than the structure shown in the drawings, so long as it is installed inside the adapter body 111 and is capable of supporting the body-sealing member 130 and the grip ring 127.

The metal sealing member 137 is made of an elastically deformable metal material, and is installed inside the adapter body 111 to provide a seal between the adapter body 111 and the pipe nipple 150. The metal sealing member 137 includes a hollow sealing member body 138, which is tapered, and a plurality of sealing member protrusions 141, which protrude from an end of the sealing member body 138. The sealing member body 138 is provided at the outer side thereof with an outer contact surface 139, which is tapered so as to closely contact the tapered seating portion 117 of the adapter body 111, and is provided at the inner side thereof with an inner contact surface 140, which is tapered so as to closely contact a nipple tapered portion 154 of the pipe nipple 150. The sealing member protrusions 141 protrude from the edge of the sealing member body 138 so as to be located on the protruding portion 118 of the adapter body 111 when the sealing member body 138 is seated in the tapered seating portion 117 of the adapter body 111.

The metal sealing member 137 is installed inside the adapter body 111 such that the sealing member body 138 is seated in the tapered seating portion 117 and the sealing member protrusions 141 are located on the protruding portion 118. When the pipe nipple 150 is threadedly engaged with the adapter body 111, the outer contact surface 139 is brought into close contact with the tapered seating portion 117 of the adapter body 111, and the inner contact surface 140 is brought into close contact with the outer surface of the pipe nipple 150, thereby providing a reliable seal between the adapter body 111 and the pipe nipple 150.

The concrete structure of the metal sealing member 137 is not limited to the structure shown in the drawings. The metal sealing member 137 may be modified into any of various other structures, so long as it is installed inside the adapter body 111 so as to be fitted between the adapter body 111 and the pipe nipple 150 and is capable of providing a seal between the adapter body 111 and the pipe nipple 150.

In addition, the connecting device 100 for piping includes a cap-sealing member 143. The cap-sealing member 143 is formed in an O-ring shape, and is made of an elastically deformable material such as rubber or silicon. The cap-sealing member 143 is disposed in the cap-sealing-member seating portion 123 of the cap 120, and thus is stably maintained at a fixed position without moving within the cap 120. The cap-sealing member 143 is brought into close contact with the outer circumferential surface of the pipe 20 introduced into the cap through-hole 121 in the cap 120, thereby providing a seal between the cap 120 and the pipe 20.

The pipe nipple 150 is fixed to the end of the pipe 10. The pipe nipple 150 may be fixed through welding, bonding, fusion, thread engagement, or any of various other methods depending on the material of the pipe 10. The pipe nipple 150 has a hollow structure in which a nipple through-hole 151 is formed to allow a fluid to flow therethrough. The pipe nipple 150 includes a nipple threaded portion 152, which corresponds to the nipple-coupling threaded portion 114 of the adapter body 111, a nipple cylindrical portion 153 extending with a constant width from the nipple threaded portion 152, and a nipple tapered portion 154, which protrudes forwards from the nipple cylindrical portion 153 while gradually decreasing in width. The nipple cylindrical portion 153 has a width smaller than the width of the protruding portion 118 of the adapter body 111, and the nipple tapered portion 154 is tapered so as to correspond to the tapered seating portion 117 of the adapter body 111 and has a width smaller than the width of the tapered seating portion 117.

The pipe nipple 150 is threadedly engaged with the adapter body 111, thereby being securely coupled to the adapter 110 and stably connecting the pipe 10 to the adapter 110.

As described above, the connecting device 100 for piping according to the embodiment of the present invention enables rapid and convenient connection between the two pipes 10 and 20 using the adapter 110 and the pipe nipple 150.

First, the pipe 10, to which the pipe nipple 150 is fixed, is prepared in order to connect the two pipes 10 and 20 to each other. Subsequently, as shown in FIG. 6, the pipe nipple 150 is threadedly engaged with the adapter 110. When the pipe nipple 150 is threadedly engaged with the adapter 110, the nipple tapered portion 154 of the pipe nipple 150 enters the metal sealing member 137. Before the nipple tapered portion 154 of the pipe nipple 150 contacts the inner contact surface 140 of the metal sealing member 137, the sealing member protrusions 141 of the metal sealing member 137 come into contact with the outer circumferential surface of the nipple cylindrical portion 153 of the pipe nipple 150. Thus, the pipe nipple 150 and the metal sealing member 137 are arranged such that the centers thereof are aligned with each other. In this manner, in the state in which the pipe nipple 150 and the metal sealing member 137 are arranged coaxially, the nipple tapered portion 154 of the pipe nipple 150 moves further toward the inner contact surface 140 of the metal sealing member 137. Thus, the nipple tapered portion 154 stably and closely contacts the inner contact surface 140. In addition, the outer contact surface 139 of the metal sealing member 137 closely contacts the tapered seating portion 117 of the adapter body 111. Thus, a reliable seal is achieved between the adapter body 111 and the pipe nipple 150 without the formation of a gap therebetween.

The other pipe 20 to be connected may be conveniently coupled to the adapter 110 in a one-touch insertion manner. That is, when the end of the pipe 20 enters the adapter 110 through the cap through-hole 121 in the cap 120, the grip ring 127 closely contacts and fixes the pipe 20 so that the pipe 20 is not easily separated from the adapter 110. While inserting the pipe 20 into the adapter 110, a user may look into the sleeve 132 through the window 119, and may verify whether the pipe 20 has been normally inserted into the adapter 110 or whether the pipe 20 has been stably fixed by the grip ring 127. In addition, a user may stably couple the pipe 20 to the adapter 110 by appropriately adjusting the depth to which the pipe 20 is inserted while verifying the position of the pipe 20 within the sleeve 132. When the pipe 20 is inserted into the adapter 110, the body-sealing member 130 and the cap-sealing member 143 closely contact the outer surface of the pipe 20, thereby providing a seal between the adapter 110 and the pipe 20.

In addition, the connecting device 100 for piping according to the embodiment of the present invention enables easy and convenient replacement of the parts because the grip ring 127, the body-sealing member 130, and the sleeve 132 are easily separated from the adapter body 111 after the cap 120 is separated from the adapter body 111.

Figure 8:
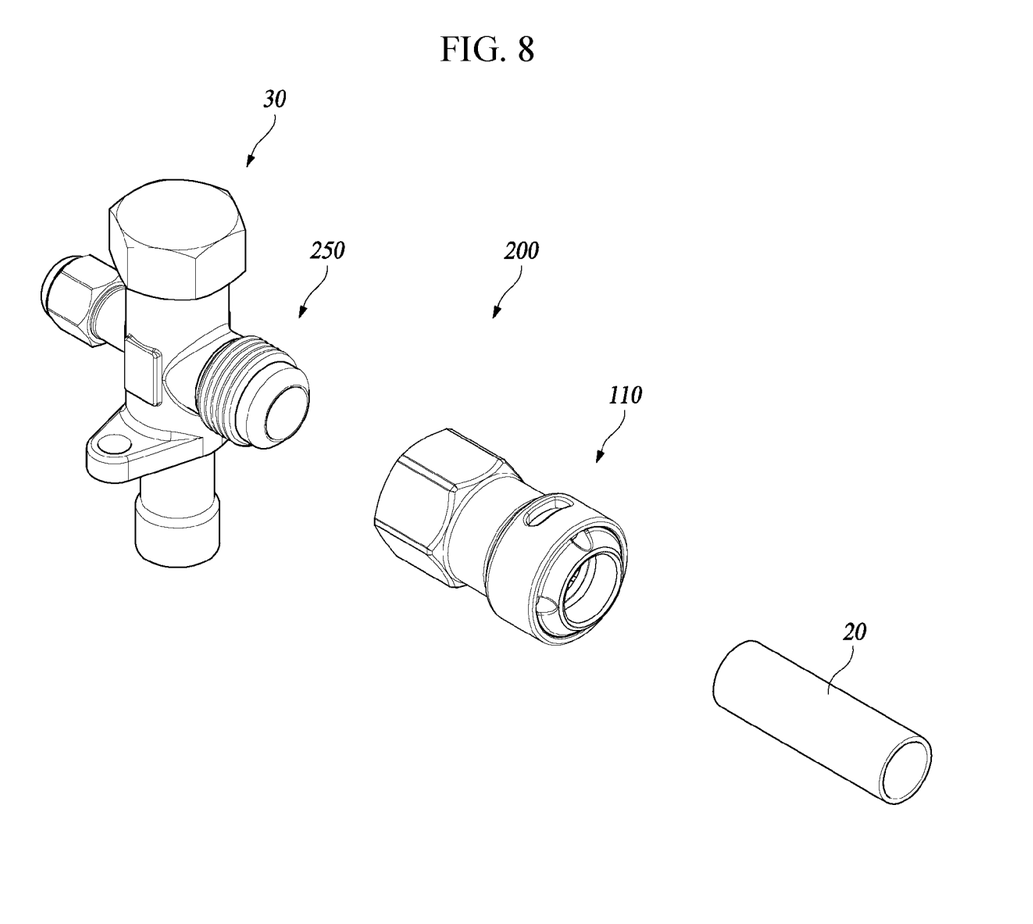
FIG. 8 is a view showing a connecting device for piping according to another embodiment of the present invention and a pipe and another part for piping that are connected to each other thereby.
Figure 9:
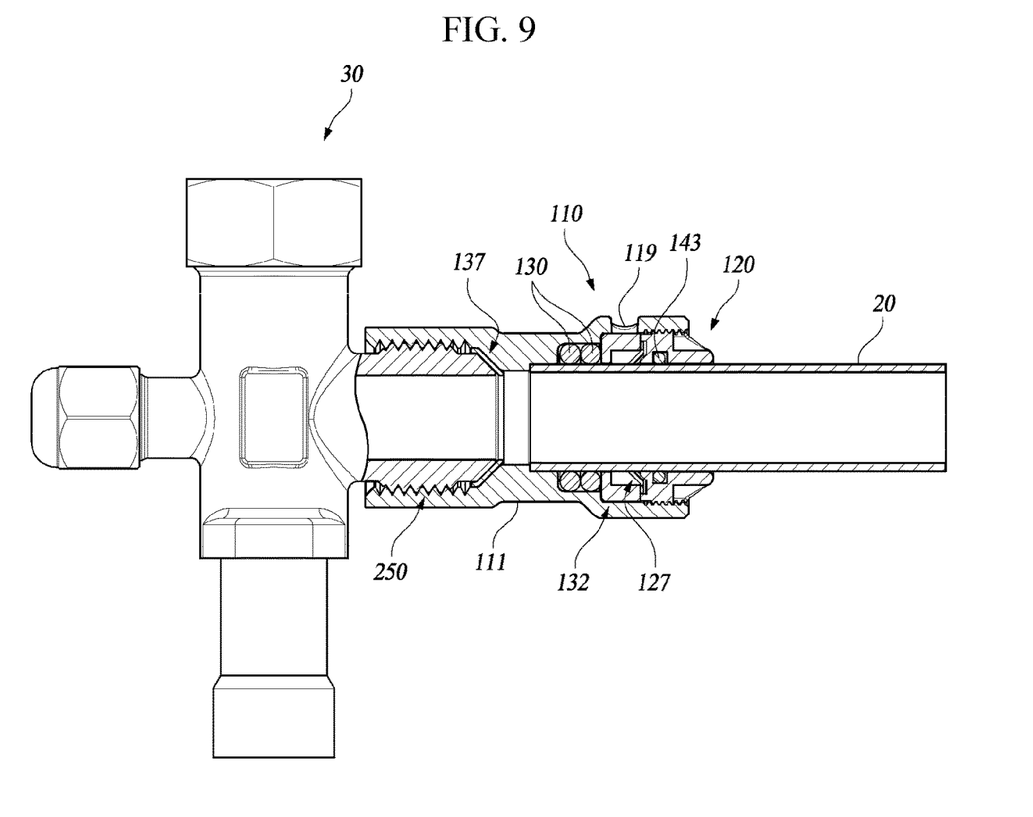
FIG. 9 is a cross-sectional view showing the connection between a pipe and another part for piping using the connecting device for piping according to another embodiment of the present invention.
Figure 10:
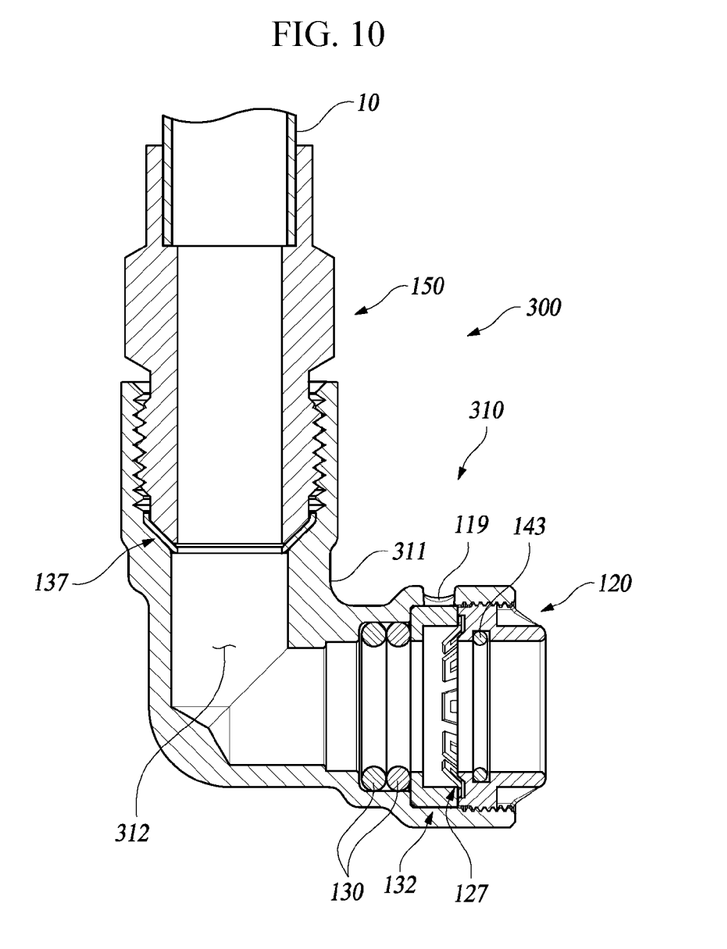
FIG. 10 is a cross-sectional view showing a connecting device for piping according to still another embodiment of the present invention.

FIGS. 8 to 10 are views showing various modifications of the connecting device for piping according to the present invention.

The connecting device 200 for piping shown in FIGS. 8 and 9 is used to connect the pipe 20 to a service valve 30, which is a part of the piping structure.

As shown in the drawings, the connecting device 200 for piping includes an adapter 110 configured such that the pipe 20 is coupled thereto in a one-touch insertion manner, and a pipe nipple 250, which is fixed to the service valve 30. The concrete structures of the adapter 110 and the pipe nipple 250 are the same as described above.

According to this connecting device 200 for piping, the pipe nipple 250, which is integrally formed with the service valve 30, is threadedly engaged with the adapter 110, and then the pipe 20 is coupled to the adapter 110 in a one-touch insertion manner, thereby rapidly and conveniently connecting the service valve 30 and the pipe 20 to each other.

The connecting device 300 for piping shown in FIG. 10 includes an adapter 310 configured such that the pipe is coupled thereto in a one-touch insertion manner, and a pipe nipple 150, which is fixed to the pipe 10. The concrete structure of the pipe nipple 150 is the same as described above.

The adapter 310 includes an adapter body 311 having an elbow structure in which a passage 312 is formed to be bent substantially perpendicularly, a cap 120 coupled to the adapter body 311, a grip ring 127, a body-sealing member 130, a sleeve 132, a metal sealing member 137, and a cap-sealing member 143. The adapter 310 differs from the adapter 110 described above in that the adapter body 311 has an elbow structure, but the remaining configuration thereof is the same as the configuration of the adapter 110 described above.

This connecting device 300 for piping may be used to conveniently connect two pipes or connect a pipe and another part for piping perpendicularly to each other.

Although the preferred embodiments of the present invention have been described, the scope of the present invention is not limited to the foregoing description made with reference to the accompanying drawings.

For example, the adapter may be modified to include an adapter body having any of various types other than the straight type or elbow type illustrated in the drawings.

As is apparent from the above description, the present invention provides a connecting device for piping, which enables rapid and convenient connection between two pipes or between a pipe and another part for piping using an adapter and a pipe nipple. That is, when the pipe nipple, which is fixed to a pipe or another part for piping, is threadedly engaged with an adapter body of the adapter, a metal sealing member installed in the adapter body provides a reliable seal between the adapter body and the pipe nipple without the formation of a gap therebetween. In addition, when an end of another pipe is introduced into the adapter, a grip ring installed in the adapter closely contacts the outer circumferential surface of the pipe and fixes the pipe so that the pipe is not separated from the adapter. As long as the pipe nipple is fixed to a pipe or another part for piping, it is possible to conveniently connect another pipe to the pipe or to the other part for piping in a one-touch insertion manner.

However, the effects achievable through the invention are not limited to the above-mentioned effects, and other effects not mentioned herein will be easily understood by those skilled in the art from the above description.

Although representative embodiments of the present invention have been illustrated and described in order to exemplify the principle of the present invention, the present invention is not limited to the specific embodiments. It will be understood that various modifications and changes can be made by those skilled in the art without departing from the spirit and scope of the invention as defined by the appended claims.

What is claimed is:

1. A connecting device for piping for connecting a pipe to another pipe or to another part for piping, the connecting device comprising:
    an adapter body having a hollow structure, the adapter body comprising a cap-coupling threaded portion formed in one end thereof, a nipple-coupling threaded portion formed in an opposite end thereof, and a tapered seating portion formed therein such that a width thereof gradually decreases from the nipple-coupling threaded portion toward the cap-coupling threaded portion;
    a cap comprising a cap through-hole formed therein to allow a pipe to pass therethrough and a cap threaded portion formed so as to correspond to the cap-coupling threaded portion to be threadedly engaged with the adapter body;
    a body-sealing member disposed in the adapter body so as to contact an outer circumferential surface of a pipe entering the adapter body;
    a grip ring disposed in the adapter body, the grip ring comprising a plurality of latching pieces configured to be elastically deformed by contact with an outer circumferential surface of a pipe entering the adapter body to fix the pipe to the adapter body;
    a pipe nipple fixed to a pipe or another part for piping, the pipe nipple comprising a nipple through-hole formed therein to allow a fluid to flow therethrough, a nipple threaded portion formed so as to correspond to the nipple-coupling threaded portion to be threadedly engaged with the adapter body, and a nipple tapered portion protruding in a forward direction of the nipple threaded portion while gradually decreasing in width; and a metal sealing member comprising a sealing member body provided at an outer side thereof with an outer contact surface tapered so as to closely contact the tapered seating portion and provided at an inner side thereof with an inner contact surface tapered so as to closely contact the nipple tapered portion, the metal sealing member being disposed in the adapter body to provide a seal between the adapter and the pipe nipple, wherein the adapter body comprises a protruding portion formed to have a constant width between the nipple-coupling threaded portion and the tapered seating portion, wherein the pipe nipple comprises a nipple cylindrical portion having a cylindrical shape and formed to have a width smaller than a width of the protruding portion between the nipple threaded portion and the nipple tapered portion, and wherein the metal sealing member comprises a plurality of sealing member protrusions protruding from an edge of the sealing member body so as to be located on the protruding portion and to contact an outer surface of the nipple cylindrical portion.

2. The connecting device according to claim 1, further comprising:

a sleeve comprising a hollow sleeve body having an outer surface that is capable of coming into contact with an inner surface of the adapter body, wherein the sleeve is disposed between the body-sealing member and the grip ring within the adapter so as to support the body-sealing member and the grip ring.

3. The connecting device according to claim 2, wherein the adapter body comprises a window formed through a portion thereof to expose an interior of the adapter body to an outside, and wherein the sleeve is light-transmissive, and is disposed at a position at which the window is formed.

4. The connecting device according to claim 2, wherein the sleeve comprises a ring-shaped inner sleeve rim portion, which protrudes from one end of the sleeve body in an inward direction of the sleeve body so as to closely contact the body-sealing member.

5. The connecting device according to claim 4, wherein the grip ring is disposed such that an edge thereof is interposed between the sleeve and the cap, and wherein the cap is in contact at an end thereof with the grip ring to press the grip ring and the sleeve toward the body-sealing member.

6. The connecting device according to claim 5, wherein the grip ring comprises a plurality of connecting portions interconnecting adjacent ones of the plurality of latching pieces, and wherein the cap is provided at an end thereof with a seating groove in which the plurality of connecting portions is received, the seating groove being formed to surround the cap through-hole.

7. The connecting device according to claim 1, wherein the latching pieces are disposed around a pipe introduced into the adapter body so as to be inclined toward the pipe, and wherein the cap is provided at an end thereof with an inclined support portion that is inclined at an angle that corresponds to an angle at which the latching pieces are inclined so as to support the latching pieces within the grip ring.

8. The connecting device according to claim 1, further comprising:

a cap-sealing member disposed in the cap so as to be capable of coming into contact with an outer circumferential surface of the pipe passing through the cap.

* * * * *